United States Patent
Asai et al.

(10) Patent No.: US 8,327,822 B2
(45) Date of Patent: Dec. 11, 2012

(54) DIESEL ENGINE

(75) Inventors: Gou Asai, Osaka (JP); Takeshi Takahashi, Osaka (JP); Terumitsu Takahata, Osaka (JP); Takahiko Kimura, Kariya (JP); Tomoyuki Tsuda, Kariya (JP)

(73) Assignees: Yanmar Co., Ltd., Osaka (JP); Denso Corporation, Aichi (JP)

( * ) Notice: Subject to any disclaimer, the term of this patent is extended or adjusted under 35 U.S.C. 154(b) by 214 days.

(21) Appl. No.: 12/678,644

(22) PCT Filed: Sep. 16, 2008

(86) PCT No.: PCT/JP2008/066658
§ 371 (c)(1),
(2), (4) Date: Jun. 28, 2010

(87) PCT Pub. No.: WO2009/038044
PCT Pub. Date: Mar. 26, 2009

(65) Prior Publication Data
US 2010/0258077 A1 Oct. 14, 2010

(30) Foreign Application Priority Data
Sep. 21, 2007 (JP) .................... 2007-245022

(51) Int. Cl.
*F02B 3/08* (2006.01)
(52) U.S. Cl. .............................. 123/298; 123/305
(58) Field of Classification Search ........... 123/294–305
See application file for complete search history.

(56) References Cited

U.S. PATENT DOCUMENTS

| 2,172,170 | A | * | 9/1939 | Megroot | 123/276 |
|---|---|---|---|---|---|
| 4,522,173 | A | * | 6/1985 | Agache | 123/276 |
| 4,800,855 | A | | 1/1989 | Elsbett et al. | |
| 6,854,438 | B2 | * | 2/2005 | Hilger et al. | 123/260 |
| 7,861,685 | B2 | * | 1/2011 | Sono et al. | 123/298 |
| 7,909,271 | B2 | * | 3/2011 | Cavanagh et al. | 239/533.12 |
| 7,987,833 | B2 | * | 8/2011 | Cho et al. | 123/279 |
| 2003/0217732 | A1 | * | 11/2003 | Kataoka et al. | 123/276 |
| 2011/0023819 | A1 | * | 2/2011 | Ives et al. | 123/298 |

FOREIGN PATENT DOCUMENTS

DE 196 49 052 A1 11/1996
(Continued)

OTHER PUBLICATIONS

English translation of Chinese Office Action for CN Appl. No. 200880107942.2, issued May 5, 2011, Chinese Patent Office, 4 pages.

(Continued)

*Primary Examiner* — Erick Solis
(74) *Attorney, Agent, or Firm* — Sterne, Kessler, Goldstein & Fox P.L.L.C.

(57) ABSTRACT

A diesel engine in which a lubrication oil on the wall surface of the cylinder liner is prevented from being burned and diluted, and a smoke resulting from the local lack of air in the combustion chamber is also prevented from being generated. The diesel engine comprises a group injection hole nozzle 20 and a piston 110. A step 115 having a height gradually increased toward the radial outer circumference of the piston is formed over the entire circumference of the top surface 111 of the piston. Furthermore, a tilted part 115*b* is formed as the step surface of the step 115.

6 Claims, 12 Drawing Sheets

FOREIGN PATENT DOCUMENTS

| | | |
|---|---|---|
| GB | 2 182 724 A | 5/1987 |
| JP | 57-42164 | 3/1982 |
| JP | 58-183933 | 12/1983 |
| JP | 60-1961 | 1/1985 |
| JP | 62-087665 | 4/1987 |
| JP | 63-094021 | 4/1988 |
| JP | 2000-220520 | 8/2000 |
| JP | 2001-207853 | 8/2001 |
| JP | 2006-022781 | 1/2006 |
| JP | 2006-070802 | 3/2006 |
| JP | 2006-125388 | 5/2006 |
| JP | 2006-242159 | 9/2006 |
| JP | 2007-211644 | 8/2007 |
| RU | 47980 U | 9/2005 |

OTHER PUBLICATIONS

International Search Report for International Application No. PCT/JP2008/066658, Japanese Patent Office mailed Oct. 21, 2008, 2 pgs.

English Translation of Russian Office Action issued in connection with corresponding RU Application No. 2010115762/06(022336), Russian Patent Office, mailed Jul. 4, 2011, 8 pages (including translation).

* cited by examiner

Fig.12

DIESEL ENGINE

BACKGROUND OF THE INVENTION

1. Field of the Invention

The present invention relates to a diesel engine. In more detail, the present invention relates to a structural art of a combustion chamber of a diesel engine having a group injection hole nozzle.

2. Background Art

A combustion chamber of a diesel engine is demarcated by a top surface of a piston moving upward or downward and a wall surface of a cylinder liner. A fuel injection nozzle is provided in the upper portion of the combustion chamber. The fuel injection nozzle has a nozzle body forming an injection hole and a nozzle for opening and closing the injection hole. There is well known a group injection hole nozzle as a fuel injection nozzle with two or more injection holes adjacent to each other in series along the nozzle axis direction.

Compared with a single injection hole nozzle (normal nozzle), the group injection hole nozzle can be designed so as to have smaller diameter of the injection hole. Namely, compared with the normal nozzle, the group injection hole nozzle has smaller spray particle diameter, wider compound spraying angle, and larger spray tip range. Accordingly, by using the group injection hole nozzle, the performance of a mixture of air and fuel is improved so as to reduce combustion noise and smoke.

Generally, with regard to the normal nozzle, pass-through ability of spray is reduced in a diesel engine with a large bore diameter. However, with regard to the group injection hole nozzle, pass-through ability of spray is maintained in a diesel engine with a large bore diameter by interaction of adjacent sprays.

The Japanese Patent Laid Open Gazette 2006-070802 discloses a group injection hole nozzle comprising two injection holes provided in series and twisted against each other.

However, with regard to the group injection hole nozzle disclosed in the Japanese Patent Laid Open Gazette 2006-070802, when fuel injection is performed at downward movement process of a piston, fuel injected from the group injection hole touches the piston top surface and then moves to a wall surface of a cylinder liner and collides with the wall surface. Then, it is disadvantageous that burning of lubricating oil and dilution of lubricating oil occurs on the wall surface of the cylinder liner. It is also disadvantageous that localized insufficiency of air occurs in a combustion chamber so as to generate smoke.

BRIEF SUMMARY OF THE INVENTION

Problems to Be Solved by the Invention

The purpose of the present invention is to provide a diesel engine in which lubricating oil on a wall surface of a cylinder liner is prevented from being burned and diluted, and smoke resulting from localized lack of air in a combustion chamber is also prevented from being generated.

Means for Solving the Problems

A diesel engine according to the present invention has a group injection hole nozzle, and a step is provided over all perimeter of a piston top surface so that height of the step is increased outwardly along a diameter of the piston.

Accordingly, movement direction of spray of fuel injection touching a piston top surface is changed upward at the downward movement of the piston so that the spray is prevented from touching a cylinder liner wall surface.

With regard to the diesel engine according to the present invention, preferably, a step surface of the step is perpendicular to the piston top surface.

Accordingly, even if the group injection hole nozzle has injection hole angle which increases pass-through ability of spray along the direction of diameter, the spray is prevented from touching a cylinder liner wall surface.

With regard to the diesel engine according to the present invention, preferably, a step surface of the step is tilted.

Accordingly, even if the piston has large heat load, the spray is prevented from touching a cylinder liner wall surface.

With regard to the diesel engine according to the present invention, preferably, a step surface of the step is curved.

Accordingly, even if the shape of the combustion chamber has strong squish flow, the wall surface forming the step is circular and arc-like shaped so as to prevent back squish flow from being spoiled.

With regard to the diesel engine according to the present invention, preferably, each of injection holes of the group injection hole has optional opening angle between the injection holes, and compound spraying angle of each of the group injection holes is different from each other.

Accordingly, degree of freedom of design is improved, for example, compound spraying angle is increased by making each of opening angle different from each other.

With regard to the diesel engine according to the present invention, preferably, distances between each of the group injection holes and the step are equal to each other.

Accordingly, even if the center of the combustion chamber is different from the nozzle axis because of constraint of design, or even if the center of the combustion chamber is different from the nozzle axis and the opening angle of the group injection hole is changed corresponding to the distance between the group injection hole and the wall surface of the cylinder liner, the spray is prevented from touching a cylinder liner wall surface.

With regard to the diesel engine according to the present invention, preferably, when the piston is at a top dead point, spray from each of the group injection holes collides with a wall surface of a combustion chamber.

Accordingly, since the combustion in the combustion chamber is normally started or finished in the vicinity of the top dead point of the piston, the whole spray is supplied into the combustion chamber and is combusted except for at the downward movement process of the piston.

Effect of the Invention

According to the diesel engine of the present invention, lubricating oil on the wall surface of the cylinder liner is prevented from being burned and diluted, and smoke resulting from localized lack of air in the combustion chamber is also prevented from being generated.

DETAILED DESCRIPTION OF THE INVENTION

The Best Mode for Carrying out the Invention

Figure 1:
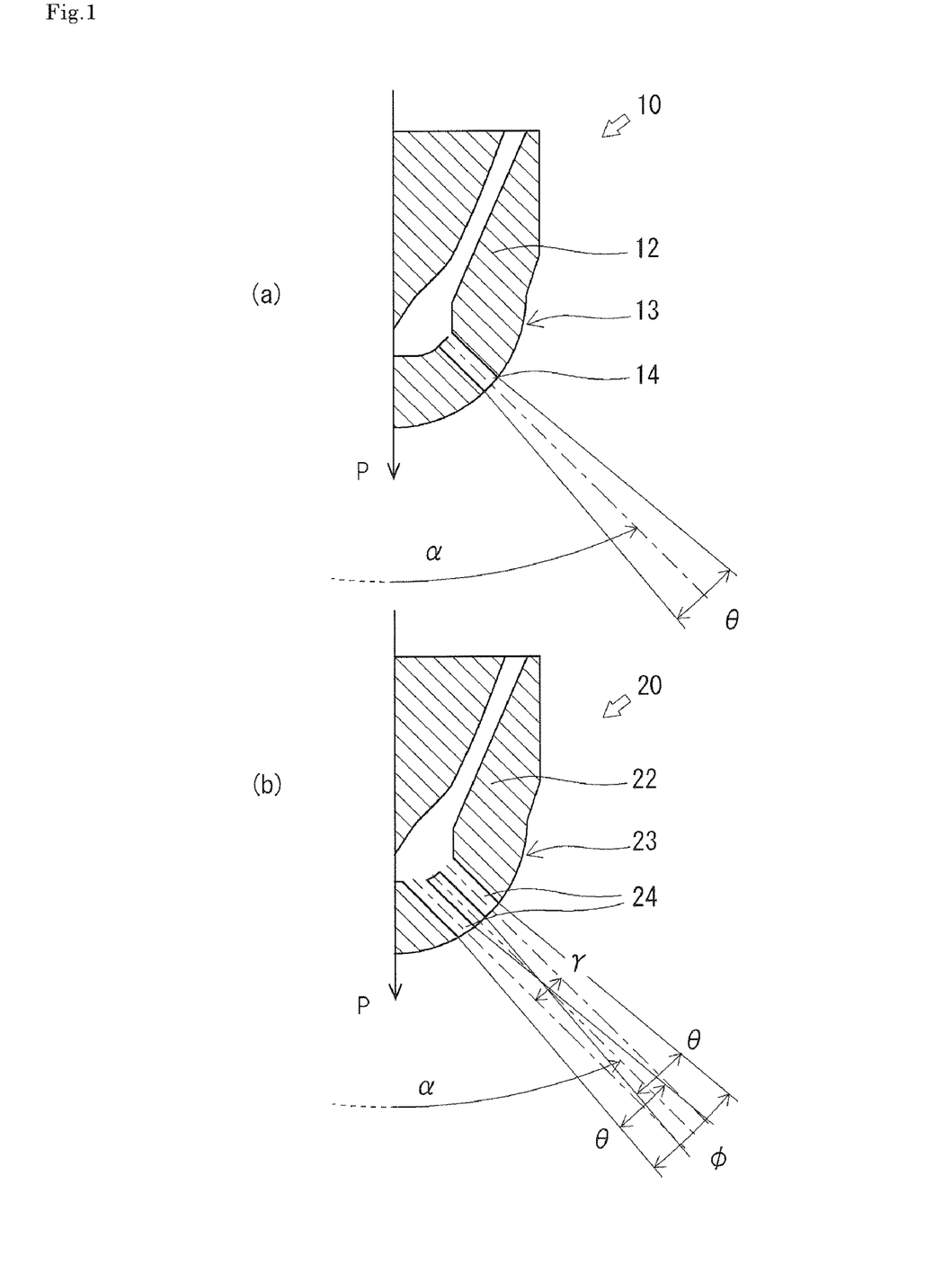
FIG. 1 is a sectional schematic drawing of comparison of a group injection hole nozzle with a single injection hole nozzle according to the present invention.

Explanation will be given on a single injection hole nozzle (normal nozzle) 10 referring to FIG. 1(a). Each cylinder head of a direct injection type diesel engine is attached thereto with the single injection hole nozzle 10 which is a fuel injection nozzle injecting fuel pressurized by a fuel injection pump or fuel pressurized in a common rail.

The single injection hole nozzle 10 has a nozzle holder 12 substantially cylindrical about a nozzle axis P and a needle (not shown). A semi-globular round head portion 13 is formed at the tip of the nozzle holder 12. The direction along the nozzle holder 12 toward the round head portion 13 is defined as the downward direction of the nozzle axis P. An injection hole 14 is bored in the round head portion 13 downward and aslant about the nozzle axis P.

Another injection hole 14 (not shown) is bored in the same surface in which the nozzle axis of the injection hole 14 passes through so as to be symmetrical to the injection hole 14 about the nozzle axis. The angle between the axes of the injection holes 14 (alternate long and short dash lines in FIG. 1(a)) and downward about the nozzle axis P is defined as injection hole angle α. The angle formed by spraying by each of the injection holes 14 is defined as spraying angle θ.

A group injection hole nozzle 20 is a fuel injection nozzle in which two or more injection holes close to each other on the same line are arranged. Group injection holes 24, 24 are bored in the group injection hole nozzle 20 so as to be close to each other on the same line on the same section through which the nozzle axis P passes. A nozzle holder 22 and a round head portion 23 have the construction similar to that of the nozzle holder 12 and the round head portion 13 of the single injection hole nozzle 10, and explanation thereof is omitted.

The compound angle of the spraying angles θ of the group injection holes 24, 24 is defined as compound spraying angle φ. Similar to the single injection hole nozzle 10, the angle between the center axes of the compound spraying angle φ (alternate long and two short dashes lines in FIG. 1(b)) and downward about the nozzle axis P is defined as injection hole angle α. The angle between the center axes of the group injection holes 24, 24 (alternate long and short dash lines in FIG. 1(b)) is defined as opening angle γ.

Compared with the single injection hole nozzle 10, with regard to the group injection hole nozzle 20, the diameter of each of the group injection holes 24, 24 can be made smaller. Namely, compared with the single injection hole nozzle 10, the group injection hole nozzle 20 has smaller spray particle diameter, wider compound spraying angle, and larger spray tip range. Accordingly, the group injection hole nozzle 20 has improved performance of a mixture of air and fuel so as to reduce combustion noise and smoke. Furthermore, degree of freedom of design is improved. For example, the compound spraying angle φ is increased by changing the opening angle γ of the group injection holes 24, 24.

Figure 2:
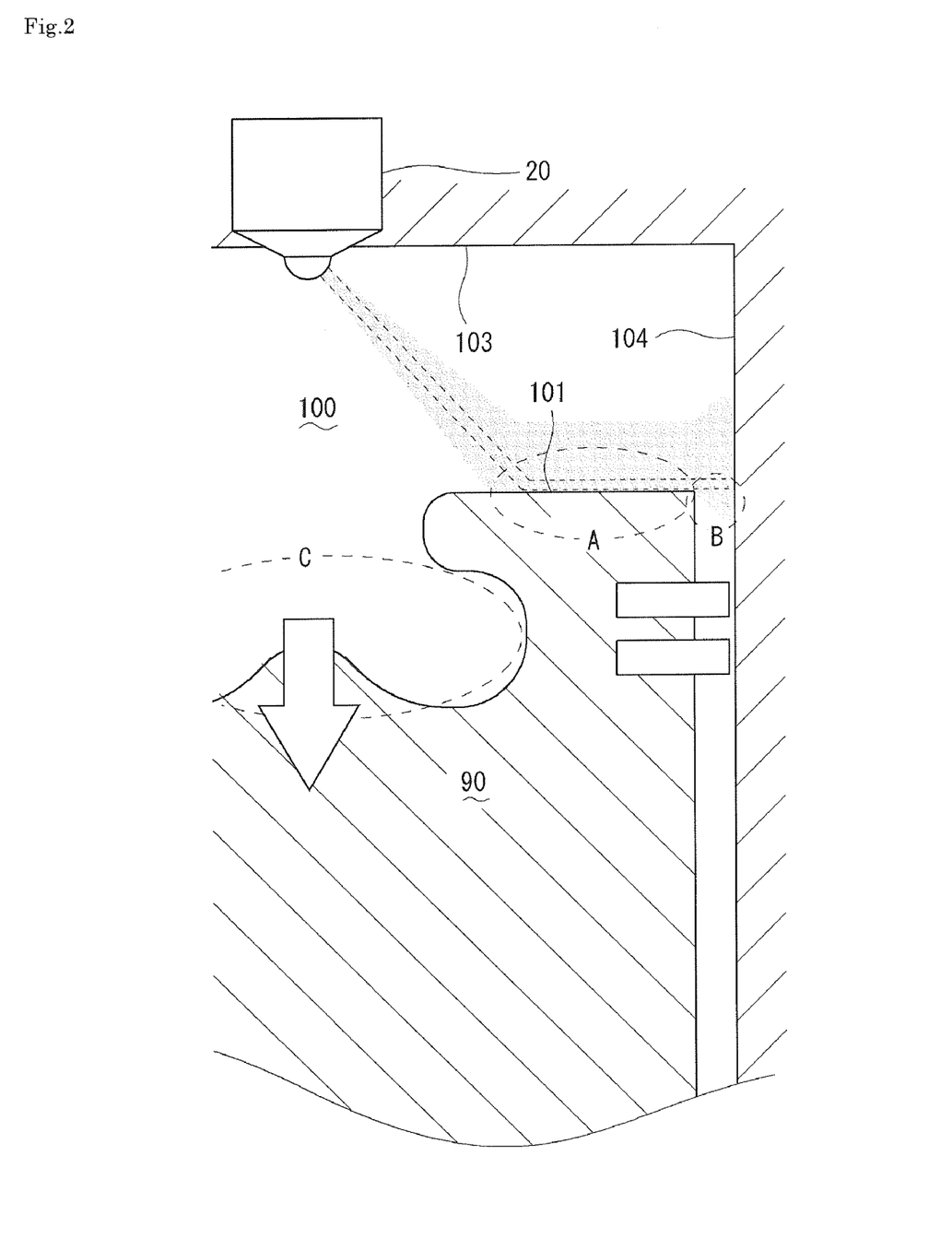
FIG. 2 is a sectional schematic drawing showing problems of the group injection hole nozzle.

Explanation will be given on the problems of the group injection hole nozzle 20 referring to FIG. 2. FIG. 2 shows fuel injection by the group injection hole nozzle 20 when a piston 90 moves downward in vertical movement. A combustion chamber 100 is a space constituted by a top surface 111 of the piston 90, a cylinder head 103, a cylinder liner wall surface 104 and a cavity (region C in the drawing) at the downward movement process of the piston 90. As mentioned above, the fuel injection by the group injection hole nozzle 20 has higher pass-through ability than the conventional single injection hole nozzle 10.

The spray by fuel injection touches a piston top surface 101 and then moves toward the cylinder liner wall surface 104. Then, in crevice region (region B in FIG. 2), the fuel colliding with the cylinder liner wall surface 104 makes lubricating oil burn and dilutes it. Furthermore, in the vicinity of the piston top surface 101 (region A in FIG. 2) and in the crevice region, air is insufficient against fuel so as to generate smoke.

Then, the embodiment of the present invention provides an art that a step provided in the piston top surface so as to make spray not reach the cylinder liner wall surface 104. Concretely, that is steps 115, 125, 135, 136, 145 and 146 shown in the embodiments 1 to 4 and explained referring to FIGS. 3 to 6. As another embodiment of the step, steps 155 and 165 are shown in the embodiments 5 and 6.

Embodiment 1

Figure 3:
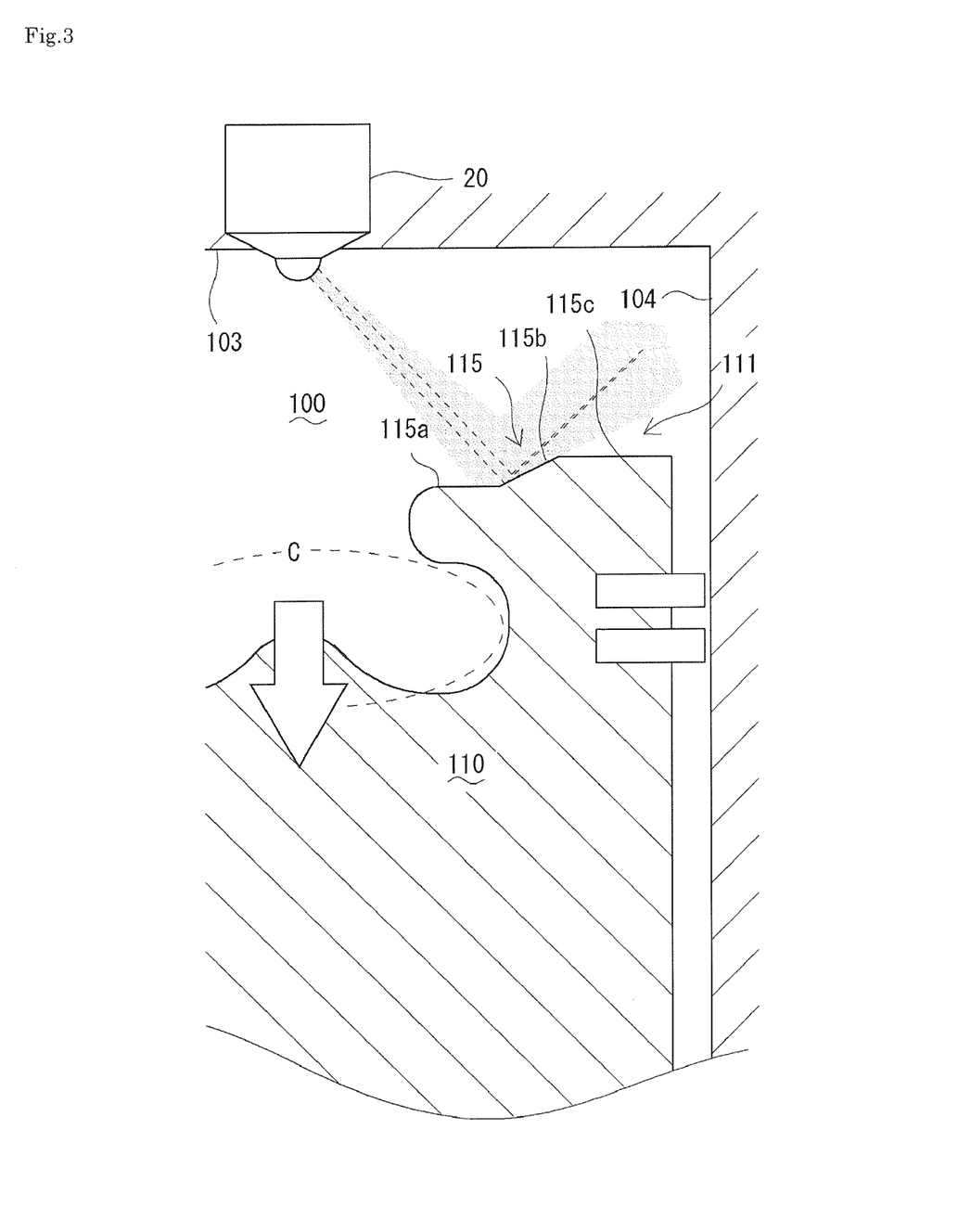
FIG. 3 is a sectional schematic drawing of embodiment 1.

Explanation will be given on the step 115 which is the embodiment 1 of the present invention referring to FIG. 3. The step 115 is provided over all the perimeter of the piston top surface 111 so that the height thereof is increased outwardly along the diameter of the piston. With regard to the step 115, a tilted part 115b is formed from a lower surface 115a to an upper surface 115c as a step surface of the step 115 (in other words, a boundary surface between the piston top surface 111 and the step 115).

The angle between the lower surface 115a and the tilted part 115b and the angle between the tilted part 115b and the upper surface 115c are not limited.

According to the construction, at the downward movement of the piston, the movement direction of spray of fuel injection touching the piston top surface 111 is changed upward by the step 115 so that the spray is prevented from touching the cylinder liner wall surface 104.

Accordingly, burning or dilution of lubricating oil on the cylinder liner wall surface 104 is prevented, and generation of smoke caused by localized insufficiency of air in the vicinity of the piston top surface 111 and in the crevice region is prevented.

Embodiment 2

Figure 4:
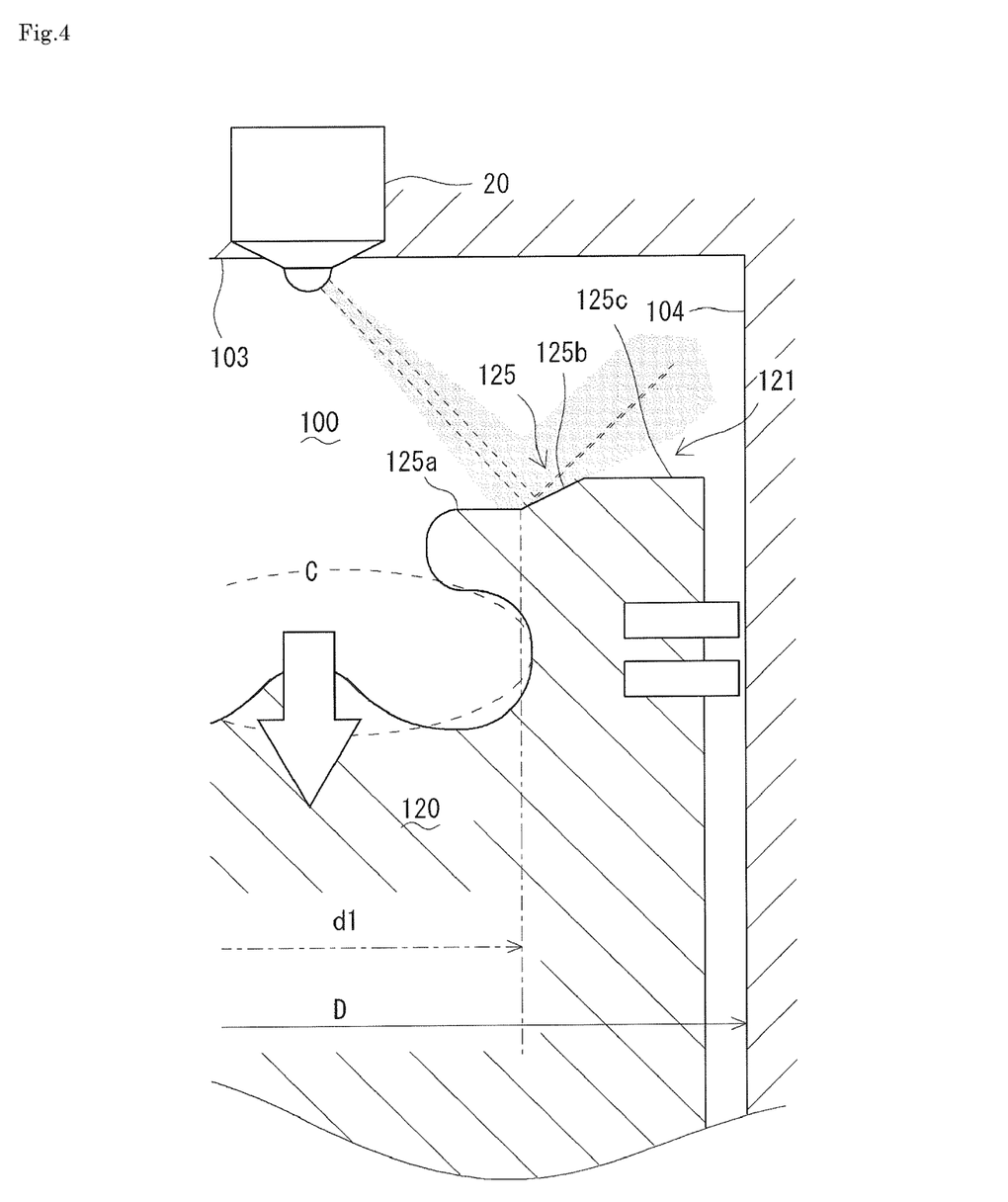
FIG. 4 is a sectional schematic drawing of embodiment 2.

Explanation will be given on the step 125 which is the embodiment 2 of the present invention referring to FIG. 4. The step 125 is provided in a piston top surface 121. The construction of the piston top surface 121 and the step 125 is similar to that of the piston top surface 111 and the step 115 of the embodiment 1, and the step 125 has a lower surface 125a, a tilted part 125b and an upper surface 125c.

In this embodiment, with regard to the piston top surface 121, when a boundary between the lower surface 125a and the tilted part 125b is defined as a step starting diameter d1, the step starting diameter d1 is not less than 50% and not more than 75% of a bore diameter D.

When the step 125 is in the vicinity of the cylinder liner wall surface 104, the movement direction of spray cannot be changed upward. By providing the step 125 within the predetermined region of the piston top surface 121 as in this embodiment, the movement direction of spray touching the piston top surface 121 during the downward movement of the piston is changed upward certainly by the step 125, whereby the spray is prevented from touching the cylinder liner wall surface 104.

Accordingly, the effect similar to the embodiment 1 can be obtained.

Embodiment 3

Figure 5:
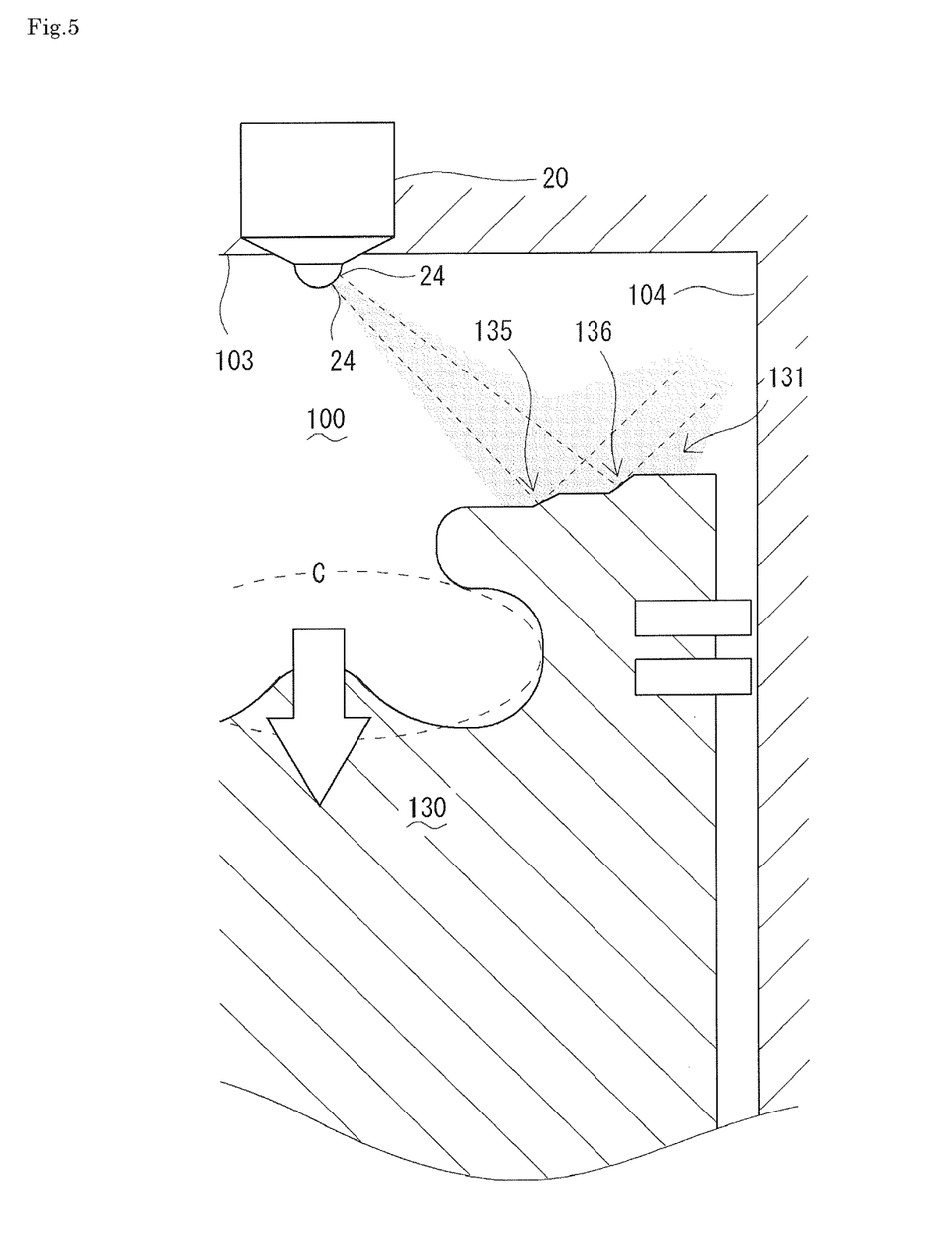
FIG. 5 is a sectional schematic drawing of embodiment 3.

Explanation will be given on the steps 135 and 136 which is the embodiment 3 of the present invention referring to FIG. 5. The steps 135 and 136 are a double step provided in a piston top surface 131. The construction of the piston top surface 131 and the steps 135 and 136 is similar to that of the piston top surface 111 and the step 115 of the embodiment 1, and each of the steps 135 and 136 has a lower surface, a tilted part and an upper surface. As shown in FIG. 5, the steps 135 and 136 are continuous, and the upper surface of the step 135 and the lower surface of the step 136 are the same surface.

Each of the steps 135 and 136 is formed corresponding to respective one of group injection holes 24, 24 of the group injection hole nozzle 20. Namely, each of the steps 135 and 136 is formed at the position with which spray collides when fuel is injected from corresponding one of the group injection holes 24, 24. In other words, each of the steps 135 and 136 is arranged on the extension of the axis of corresponding one of the group injection holes 24, 24. In this embodiment, the tilt angle of each of the steps 135 and 136 is not limited.

According to the construction, with regard to the fuel injection by the group injection hole nozzle 20, fuel injected from each of the group injection holes 24, 24 is directed upward by corresponding one of the steps 135 and 136, whereby the spray is prevented from touching the cylinder liner wall surface 104.

Accordingly, even if the opening angle $\gamma$ of the group injection holes 24, 24 is large, the effect similar to the embodiment 1 can be obtained certainly.

Embodiment 4

Figure 6:
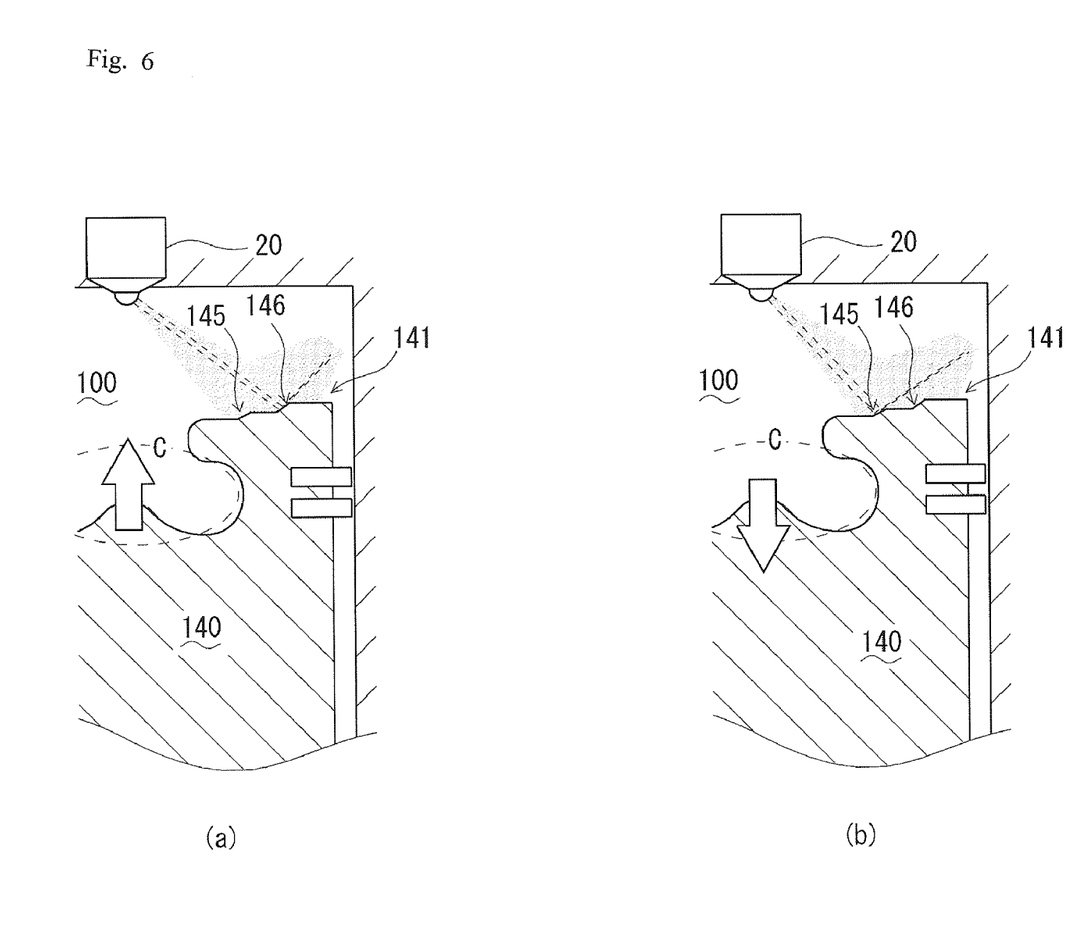
FIG. 6 is a sectional schematic drawing of embodiment 4.

Explanation will be given on the steps 145 and 146 which is the embodiment 4 of the present invention referring to FIG. 6. The steps 145 and 146 are a double step provided in a piston top surface 141. The construction of the piston top surface 141 and the steps 145 and 146 is similar to that of the piston top surface 131 and the steps 135 and 136 of the embodiment 3. However, the step 146 is formed at the position with which spray of the group injection hole nozzle 20 collides at the upward movement process of a piston 140, and the step 145 is formed at the position with which spray collides at the downward movement process of the piston 140. In this embodiment, the tilt angle of each of the steps 145 and 146 is not limited.

According to the construction, the movement direction of spray of the group injection hole nozzle 20 is changed aslant upward not only at the downward movement process of the piston 140 but also at the upward movement process by the corresponding step 146, whereby the spray is prevented from touching the cylinder liner wall surface 104.

Accordingly, the effect similar to the embodiment 1 can be obtained certainly at the upward movement process of the piston 140.

Figure 7:
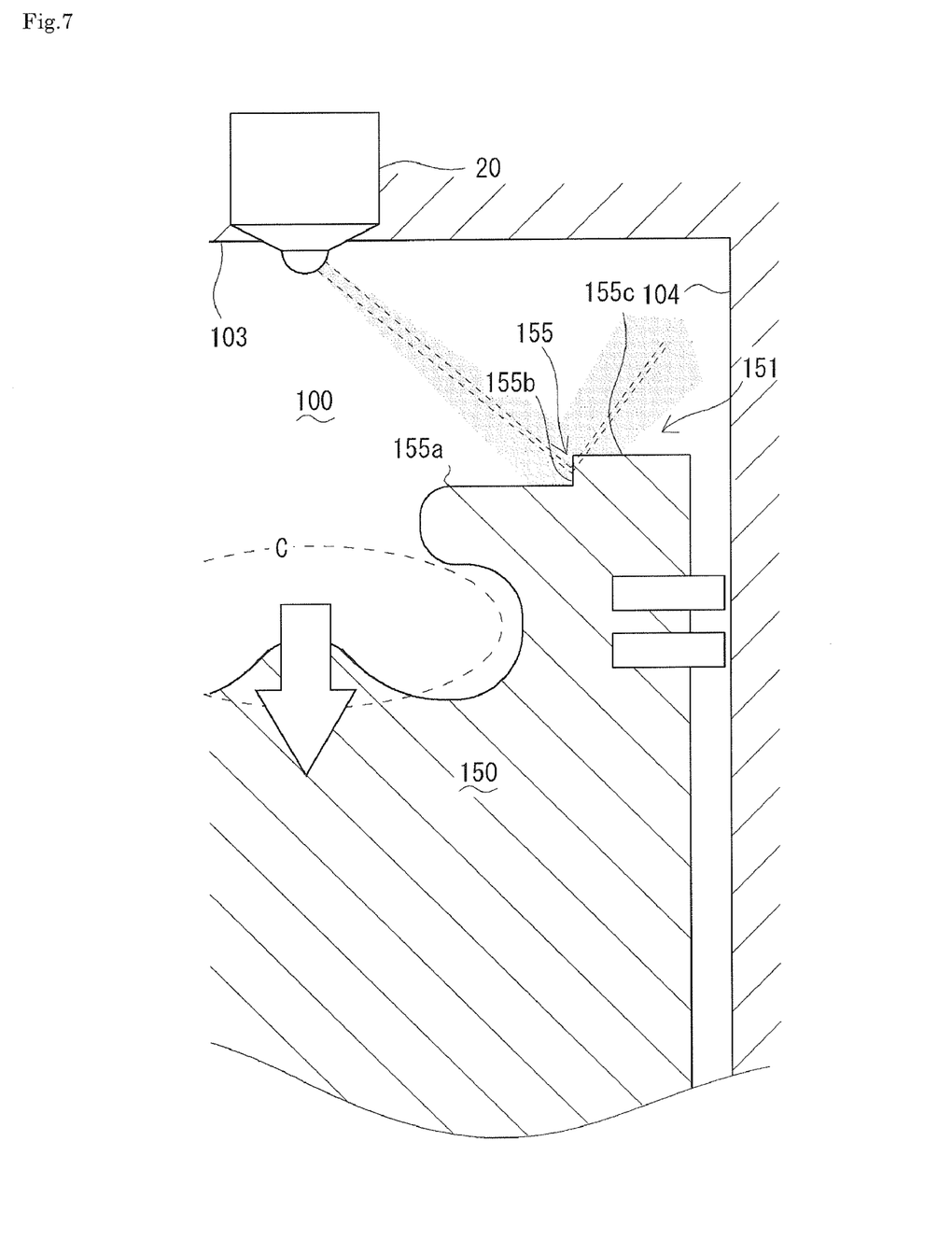
FIG. 7 is a sectional schematic drawing of embodiment 5.
Figure 8:
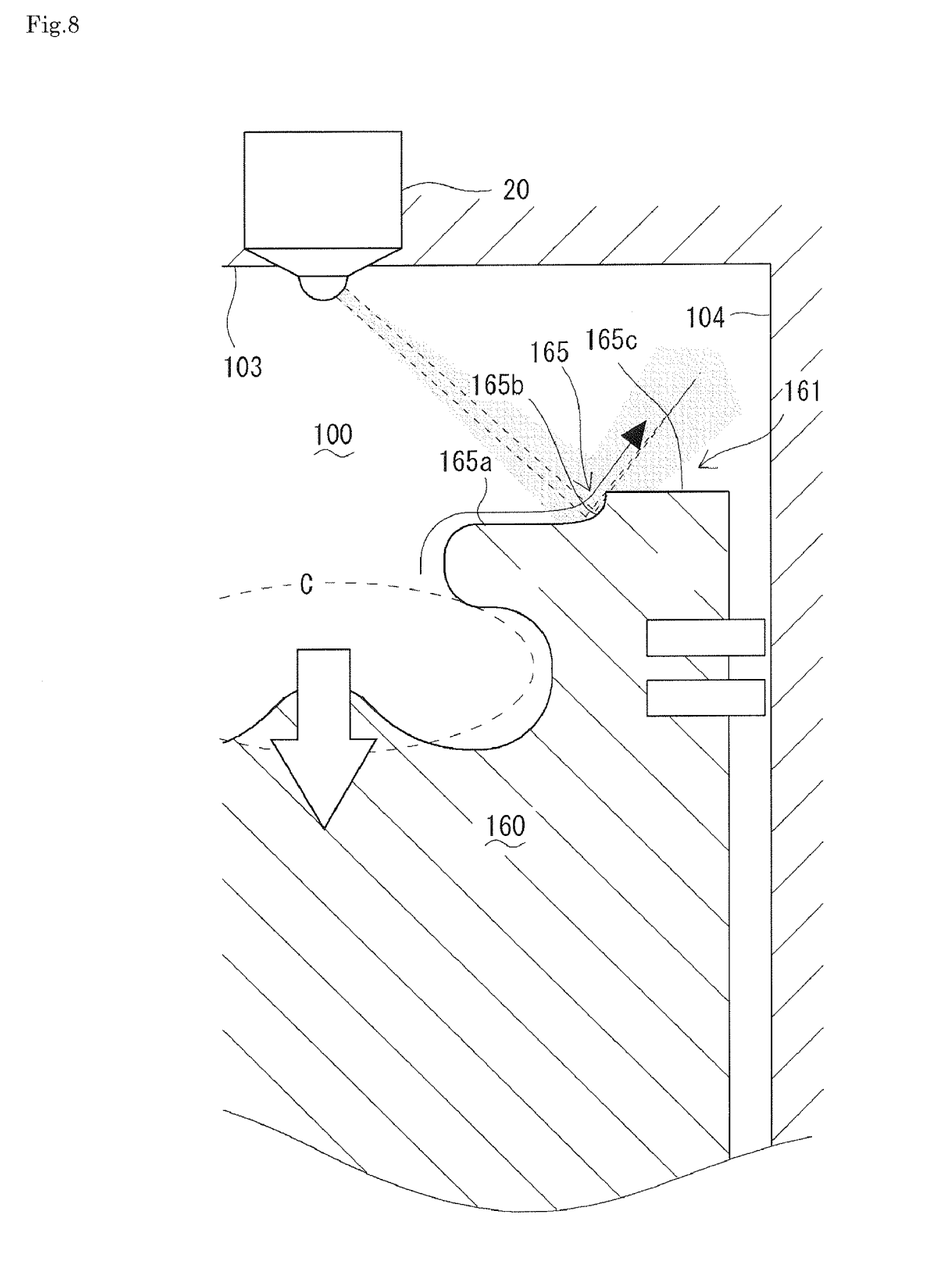
FIG. 8 is a sectional schematic drawing of embodiment 6.

Explanation will be given on the embodiments 5 and 6 of the step referring to FIGS. 7 and 8. The mode (shape, arrangement and the like) of each of the steps 155 and 165 is adoptable to each of the above-mentioned embodiments 1 to 4, and by the adoption, the effect similar to each of the embodiments 1 to 4 can be obtained.

Embodiment 5

Explanation will be given on the step 155 which is the embodiment 5 of the present invention referring to FIG. 7. The step 155 is provided over all perimeter of a piston top surface 151 so that the height thereof is increased outward along the diameter of the piston. With regard to the step 155, in the sectional view along the diameter of the piston 150, a vertical part 155b is formed from a lower surface 155a to an upper surface 155c as a step surface of the step 155 (in other words, a boundary surface between the piston top surface 151 and the step 155). Namely, the angle between the lower surface 155a and the vertical part 155b and the angle between the vertical part 155b and the upper surface 155c is 90°.

For example, the group injection hole nozzle 20 having large injection hole angle $\alpha$ has high pass-through ability of spray. Then, according to the construction of this embodiment, the movement direction of spray which touches the piston top surface 151 at the downward movement of the piston 150 is changed upward certainly by the step 155, whereby the spray is prevented from touching the cylinder liner wall surface 104.

Accordingly, the effect similar to the embodiment 1 can be obtained certainly with the combustion chamber 100 provided therein with the group injection hole nozzle 20 having large injection hole angle $\alpha$.

Embodiment 6

Explanation will be given on the step 165 which is the embodiment 6 of the present invention referring to FIG. 8. The step 165 is provided over all perimeter of a piston top surface 161 so that the height thereof is increased outwardly along the diameter of the piston. With regard to the step 165, in the sectional view along the diameter of the piston 160, a curved part 165b is formed from a lower surface 165a to an upper surface 165c as a step surface of the step 165 (in other words, a boundary surface between the piston top surface 161 and the step 165). In the sectional view along the diameter of the piston 160, the curved part 165b is formed to be circular and arc-like, and the angle between the curved part 165b and the upper surface 165c is 90°.

According to the construction, in the cavity (region C in the drawing), the movement direction of back squish flow is changed upward smoothly (an arrow of a solid line in the drawing). Simultaneously, the movement direction of spray which touches the piston top surface 161 at the downward movement of the piston is changed upward by the step 165.

Accordingly, even if the squish flow is strong in the combustion chamber 100, the effect similar to the embodiment 1 can be obtained certainly without any effect on the back squish flow.

Explanation will be given on the combustion chamber 100 comprising the steps 115 to 165 which are the above-mentioned embodiments 1 to 6 referring to FIGS. 9 to 12.

Figure 9:
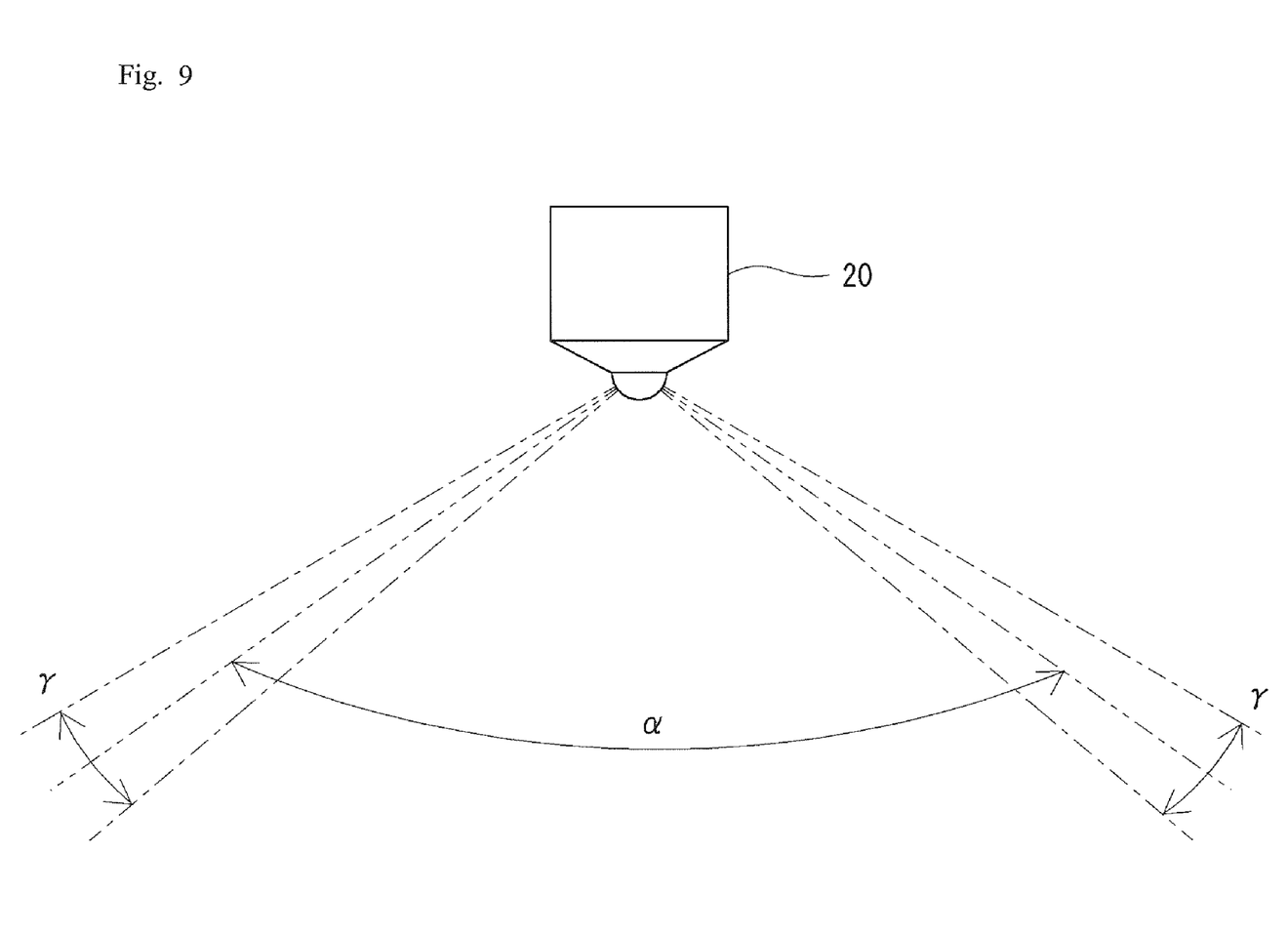
FIG. 9 is a schematic side view showing relation between injection hole angle and opening angle.

Explanation will be given on the relation between the injection hole angle $\alpha$ and the opening angle $\gamma$ of the group injection hole nozzle 20 referring to FIG. 9. Normally, with regard to the group injection hole nozzle 20, by increasing the opening angle $\gamma$, the compound spraying angle $\phi$ is increased so as to improve the space utilization rate, whereby the combustion is improved at low excess air state. However, when the opening angle γ is increased, the height of one of the steps 115 to 165 which are the above-mentioned embodiments 1 to 6 must be increased excessively so as to obtain the effect of the present invention. When the opening angle γ is increased, the injection hole angle α must be decreased. The decrease of the injection hole angle α makes the smoke worsen.

In each of the embodiments 1 to 6, the sum of the injection hole angle α and the opening angle γ is not more than 180°.

Accordingly, the effect of increasing the opening angle γ can be used while using the steps 115 to 165 combinedly effectively. For example, at medium or low speed, the worsening of smoke can be prevented while raising the torque.

Explanation will be given on the plane construction of the steps 115 to 165 of the embodiments 1 to 6 referring to FIGS. 10 and 11. In the combustion chamber 100, the distances between each of the group injection holes 24A to 24F and the step 115 are equal to each other. Next, explanation will be given on the two cases in which the construction of the combustion chamber 100 is adopted.

Figure 10:
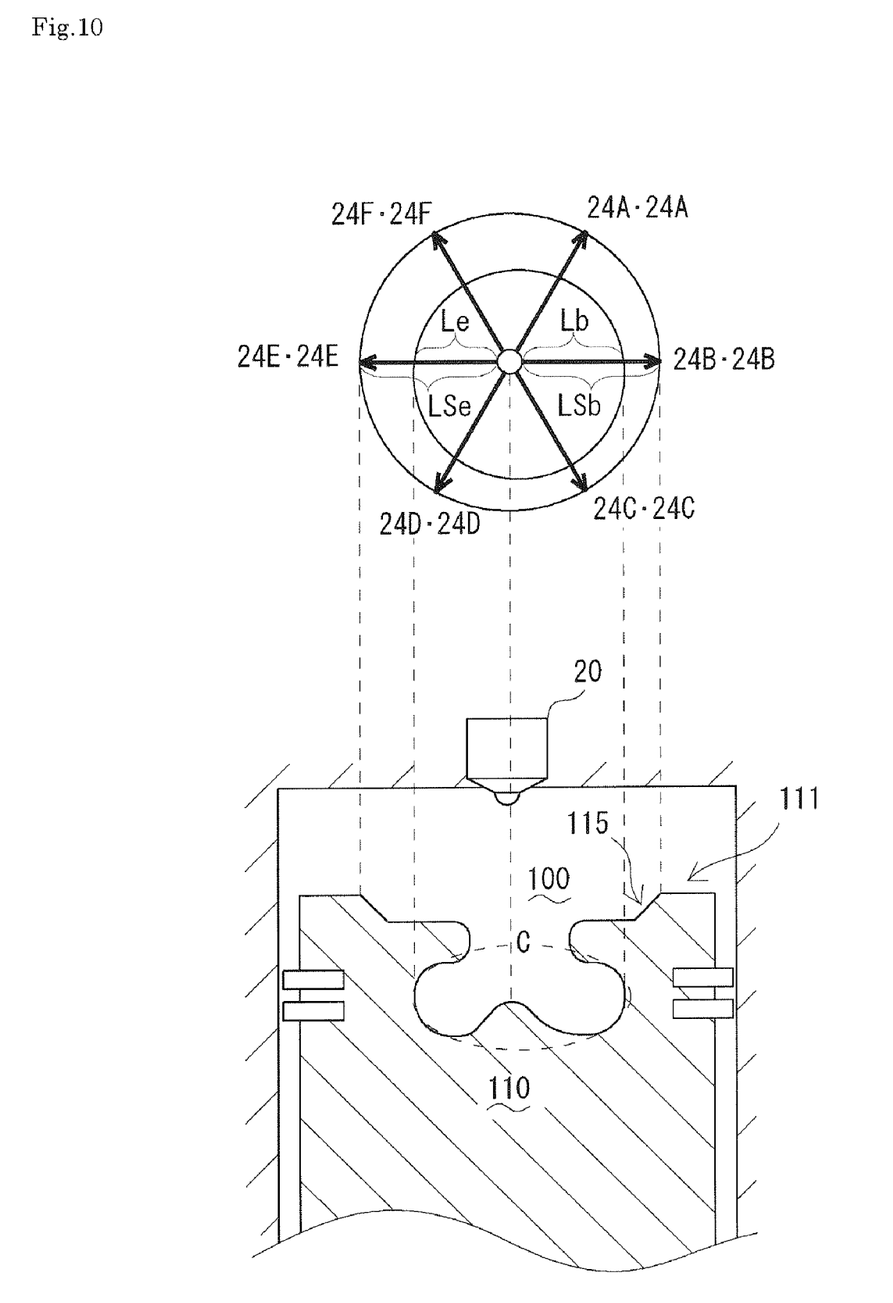
FIG. 10 is a plan view and sectional schematic drawing showing distance between each of group injection holes and a step.

The upper side of FIG. 10 shows the constructional plan view the combustion chamber 100 and the group injection hole nozzle 20, and the lower side thereof shows the constructional sectional view of the same. When viewed in plan, for example, the group injection hole nozzle 20 is provided therein with the six group injection holes 24, 24 (24A to 24F in FIG. 10). In the combustion chamber 100, for example, the piston top surface 111 forms the tilted step 115 of the above-mentioned embodiment 1. The center of the combustion chamber 100 may be in agreement with the center of the group injection hole nozzle 20, and the group injection hole nozzle 20 may alternatively be offset from the center of the combustion chamber 100. Namely, in this case, the distance between each of the group injection holes 24A to 24F and the combustion chamber 100 (Le and Lb in FIG. 10) are not equal to each other.

In the combustion chamber 100 in which the center of the combustion chamber 100 is offset from the group injection hole nozzle 20, for example, there is given the combustion chamber 100 that one intake valve and one exhaust valve are provided or the number of the intake valves is different from that of the exhaust valves. Such a construction is adopted in the case that it is difficult to arrange the group injection hole nozzle 20 at the center of the combustion chamber 100.

In the combustion chamber 100, the distances between each of the group injection holes 24A to 24F and the step 115 (for example, LSe and LSb in FIG. 10) are equal to each other.

Accordingly, with regard to all the group injection holes 24A to 24F of the combustion chamber 100, the effect similar to the embodiment 1 can be obtained certainly.

Figure 11:
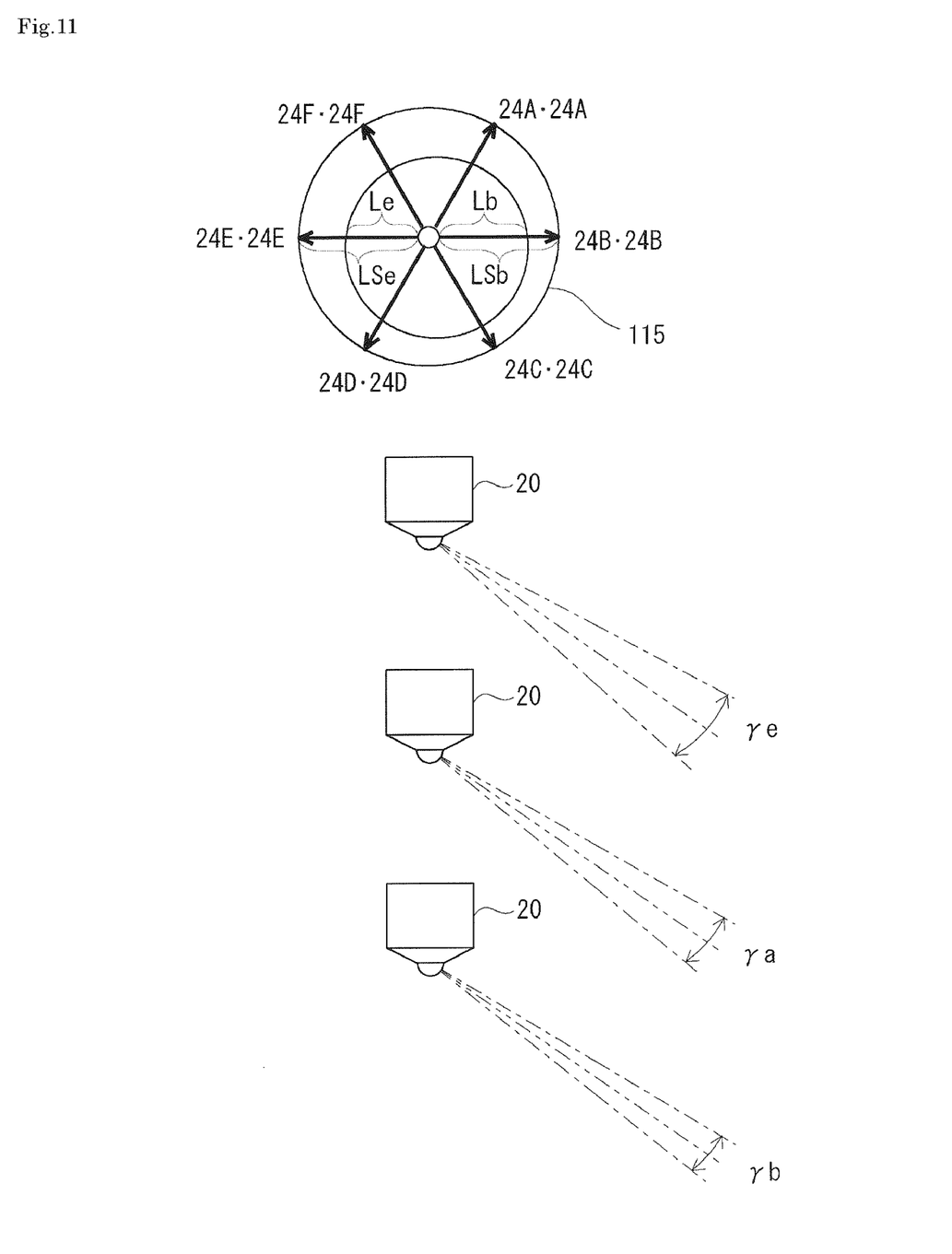
FIG. 11 is a plan view and schematic side view showing distances between each of group injection holes and a step.

The upper side of FIG. 11 shows the constructional plan view of the combustion chamber 100 and the group injection hole nozzle 20, and the lower side thereof shows the construction of the opening angles γa, γb and γe of the group injection hole nozzle 20. When the center of the group injection hole nozzle 20, which has the group injection holes at the six positions (24A, 24A) to (24F, 24F), is offset from the center of the combustion chamber (cavity C) 100, the opening angles γ of the group injection holes (24A, 24A) to (24F, 24F) are different from each other and correspond to the distance to the wall surface of the cavity C (for example, Le and Lb in FIG. 11). Namely, when the distance from the group injection holes 24, 24 to the wall surface of the combustion chamber 100 is short, the opening angle γ is large, and when the distance from the group injection holes 24, 24 to the wall surface of the cavity C is long, the opening angle γ is small.

For example, the group injection holes 24B, 24B that have the longest distance from the group injection holes 24, 24 to the wall surface of the cavity C (distance Lb) have the smallest opening angle γb, and the group injection holes 24E, 24E that the distance from the group injection holes 24, 24 to the wall surface of the cavity C is the shortest (distance Le) have the smallest opening angle γe.

Concretely, the opening angle γ is set based on the quotient of the distance L between each group injection hole 24, 24 and the wall surface of the cavity C and the average distance Lm of the distances between all the group injection holes (24A, 24A) to (24F, 24F) and the wall surface of the cavity C (L/Lm). For example, the opening angle of the group injection holes 24, 24 that the distance between the group injection holes 24, 24 and the wall surface of the cavity C is the longest is parallel (γ=0 deg), the opening angle γ of the group injection holes 24, 24 of the shortest distance is 5 deg, and the opening angle γ of each of the other group injection holes 24, 24 is proportional (5*L/Lm).

In the combustion chamber 100, the distances between each of the group injection holes (24A, 24A) to (24F, 24F) and the step 115 (for example, LSe and LSb in FIG. 10) are equal to each other. Accordingly, the opening angles at the time that the spray from each of the group injection holes 24, 24 collides with the wall surface of the cavity C are substantially equal to each other, whereby the reflection at the wall surface part of the cavity C is substantially equalized.

Accordingly, with regard to all the group injection holes (24A, 24A) to (24F, 24F) of the combustion chamber 100, the effect similar to the embodiment 1 can be obtained certainly.

Figure 12:
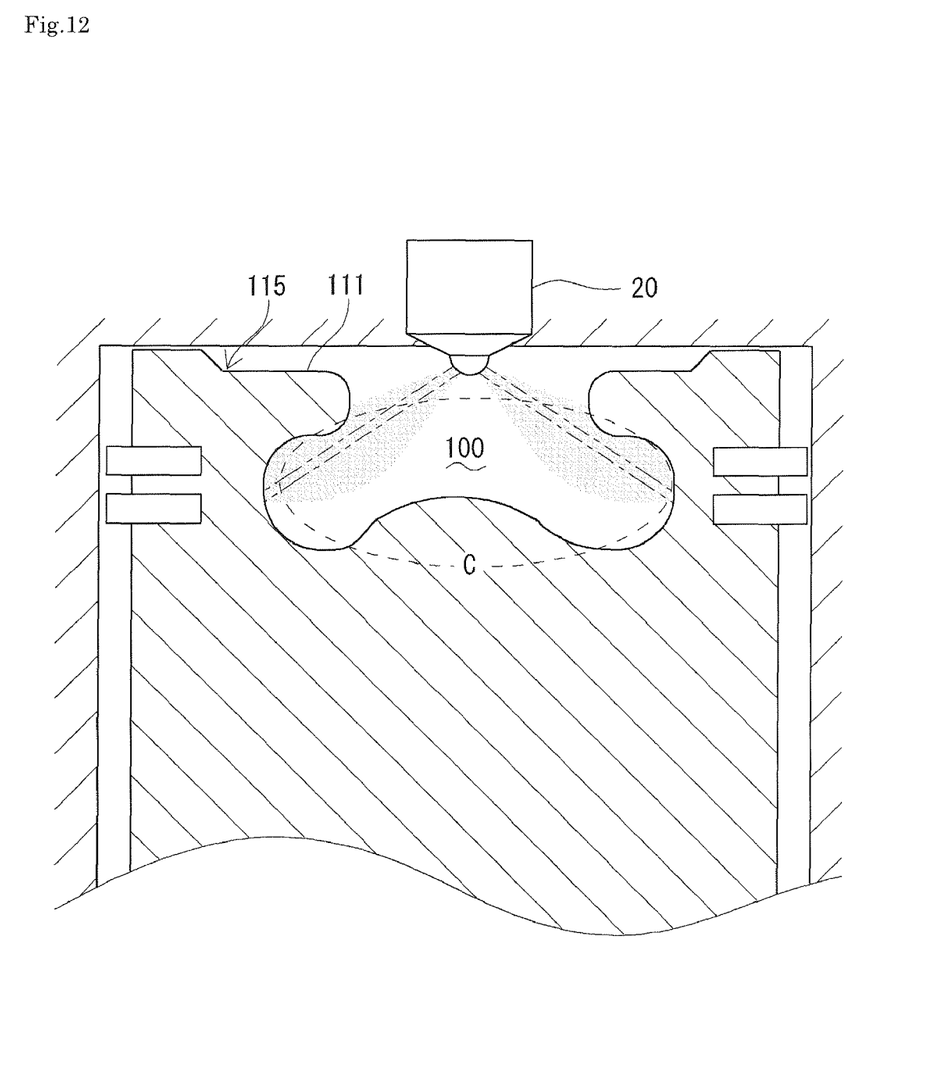
FIG. 12 is a sectional schematic drawing at a top dead point.

Explanation will be given on the fuel injection at a top dead point of the combustion chamber 100 in which the steps of the embodiments 1 to 6 are constructed referring to FIG. 12. As mentioned above, at the downward movement of the piston 110, the combustion chamber 100 is the space constituted by the top surface 102 of the piston 90, the cylinder head 103 and the cylinder liner wall surface 104. However, at the top dead point of the piston 110, the combustion chamber 100 is the cavity (region C in the drawing).

In the combustion chamber 100, for example, the piston top surface 111 forms the step 115 of the above-mentioned embodiment 1. In this case, at the top dead point of the piston 110, the whole spray collides with the wall surface of the combustion chamber 100, that is, the cavity.

Accordingly, the whole spray is supplied into the combustion chamber 100 so as to obtain ideal combustion.

INDUSTRIAL APPLICABILITY

The present invention can be used for a diesel engine having a group injection hole nozzle.

What is claimed is:
1. A diesel engine comprising:
a group injection hole nozzle including a plurality of injection holes;
a piston having a top surface; and
a step provided on the top surface,
wherein the height of the step increases in an outward direction along a diameter of the piston,
wherein the plurality of injection holes include a plurality of sets of injection holes such that each set of injection holes has an opening angle, which is the angle between the center axes of the injection holes within the set,
wherein the group injection hole nozzle has a first compound spraying angle, which is the angle between the middle of the opening angle of a first set of group injection holes and the middle of the opening angle of a second set of group injection holes located on an opposite side of the group injection hole nozzle, wherein the group injection hole nozzle has a second compound spraying angle, which is the angle between the middle of the opening angle of a third set of group injection holes and the middle of the opening angle of a fourth set of group injection holes located on an opposite side of the group injection hole nozzle, and wherein the first compound spraying angle is different than the second compound spraying angle.

2. The diesel engine as set forth in claim 1, wherein a step surface of the step is perpendicular to the piston top surface.

3. The diesel engine as set forth in claim 1, wherein a step surface of the step is tilted with respect to the piston top surface.

4. The diesel engine as set forth in claim 1, wherein a step surface of the step is curved.

5. The diesel engine as set forth in claim 1, wherein each of the plurality of group injection holes is the same distance from the step.

6. The diesel engine as set forth in claim 1, wherein when the piston is at a top dead point, spray from each of the plurality of injection holes collides with a wall surface of a combustion chamber.

* * * * *